July 28, 1925.

F. H. PAQUIN 1,547,521

AUTOMOBILE SIGNAL CONTROL SWITCH

Filed March 13, 1922

Inventor
Frederick H. Paquin,

Patented July 28, 1925.

1,547,521

UNITED STATES PATENT OFFICE.

FREDERICK H. PAQUIN, OF DETROIT, MICHIGAN.

AUTOMOBILE SIGNAL-CONTROL SWITCH.

Application filed March 13, 1922. Serial No. 543,207.

*To all whom it may concern:*

Be it known that I, FREDERICK H. PAQUIN, a citizen of the United States of America, residing at Detroit, in the county of Wayne and State of Michigan, have invented certain new and useful Improvements in Automobile Signal-Control Switches, of which the following is a specification, reference being had therein to the accompanying drawings.

This invention relates to automobile signal control switches, and has special reference to that class of signals including exhibitors and a manually operated switch for controlling the operation of the exhibitors. One of the exhibitors is of that type including a casing having sign members that may be individually illuminated from within the casing to indicate directions of travel or other traffic conditions. The other exhibitor may be a "stop" signal on the rear part of an automobile. The switch is included in a plurality of electrical circuits which also include the incandescent lamps in the signal exhibitors and my invention may be characterized in the following particulars.

First, there is a novel switch casing that may be mounted on the steering column assembly of an automobile or at some point convenient to the driver or operator of the automobile, and the switch includes a button controlling the horn or audible signal of the automobile, and a plurality of plunger switches controlling electric circuits of the front and back exhibitors and a lock mechanism which may be actuated to place the signal circuits in an operative condition, lock mechanism controlling what may be considered as a master switch.

Second, a novel construction enters into the switch permitting of easy access being had to all parts thereof and this construction will be hereinafter described and then claimed.

Reference will now be had to the drawings, wherein—

Figure 1:
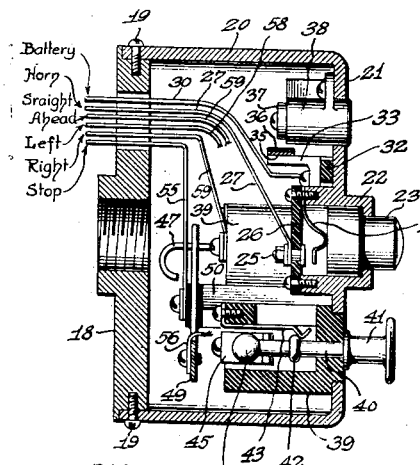
Fig. 1 is a longitudinal sectional view of the switch.
Figure 2:
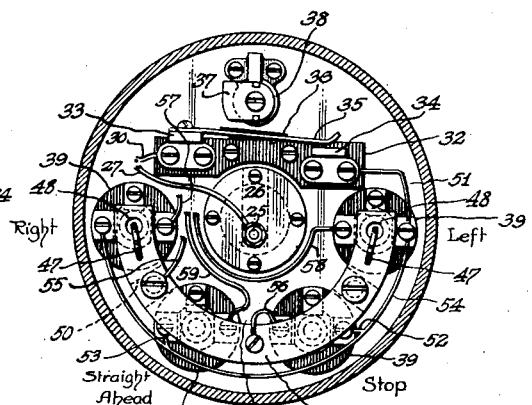
Fig. 2 is a cross sectional view of the same.
Figure 3:
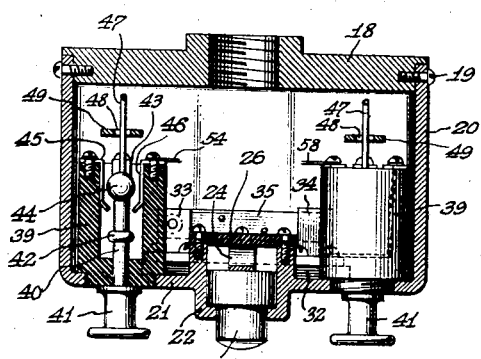
Fig. 3 is a horizontal sectional view of the switch.
Figure 4:
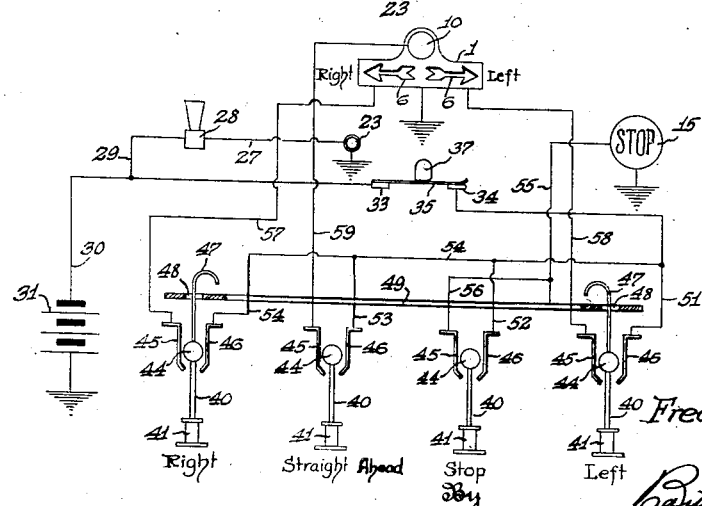
Fig. 4 is a diagrammatic view of the electrical wiring between the exhibitors, switch and a suitable source of electrical energy.

The reference numeral 18 denotes a base plate that may be screwed or otherwise mounted on top of the steering column assembly of an automobile in lieu of the usual nut which retains the steering wheel on the steering post or shaft. Seated on the marginal edges of the base plate 18 and connected thereto by screws 19 is a cylindrical casing 20 having a front wall 21 provided with a central hollow boss 22 in which is located a push button 23. The push button 23 normally engages a resilient contact member 24 adapted to engage a stationary contact member 25, carried by an insulator 26 suitably secured to the inner end of the hollow boss 22 and the stationary contact member 25 is connected by a wire 27 to an electrically operated horn or audible signal 28 connected by wires 29 and 30 to a suitable source of electrical energy, as battery cells 31, said battery cells and the switch casing 20 being suitably grounded or provided with a return circuit, as shown in Fig. 4. It is obvious that the horn or audible signal 28 can be conveniently operated from the switch casing, and it will be noted that the electric circuit for this audible signal is independent of other circuits to be hereinafter described.

Mounted on the inner face of the front wall 21, above the hollow boss 22, is a transversely disposed insulator 32 provided at one end with a bracket 33 and at the opposite end with a stationary contact member 34 adapted to be engaged by a resilient contact member or blade 35 carried by the bracket 33. The contact members 34 and 35 constitute a master switch that is normally open and on the contact member 35 is an insulator 36 adapted to be engaged by the crank portion 37 of a barrel tumbler lock mechanism, generally designated 38, said lock mechanism being mounted in the front wall 21 and controlled by a key which permits of the operator of the automobile actuating the lock mechanism to close the master switch, which in turn controls the source of electrical energy for signalling purposes, as will hereinafter appear.

Suitably mounted in the front wall 21 and grouped about the hollow boss 22 are a plurality of individual switches of the plunger type. These switches will be hereinafter generally referred to as "right, left, stop and straight ahead" switches, and since said switches are identical in construction, I deem it only necessary to describe the detail construction of one of said switches.

Each switch comprises a housing or barrel 39 made of insulation material with the outer end of the housing closed and mounted in the front wall 21 and the inner end of the housing open. Slidable in the closed outer end of the housing 39 is a plunger 40 having its outer end provided with a knob or finger piece 41, and intermediate the ends of the plunger is a collar 42 normally engaged by a resilient detent 43, carried by the inner end of the housing, said detent holding the plunger in an adjusted position. On the inner end of the plunger 40 is a head or bridge piece 44 adapted to engage and electrically connect opposed contact members 45 and 46 carried by the inner end of the housing.

The heads or bridge pieces 44 of the right and left switches are provided with contact members 47 extending through openings 48 in a segment shaped bus bar 49, supported by brackets 50 projecting inwardly from the front wall 21, said bus bar being suitably insulated from the brackets 50.

Considering the electrical connections, as best shown in Fig. 4, there is an exhibitor 1 having "left" and "right" signals 6 and a "straight ahead" signal 10. I desire to use a "stop" exhibitor 15 and both exhibitors are suitably grounded. The stationary contact member 34 of the master switch is connected by a wire 51 to the contact member 46 of the left switch and this wire has branches 52, 53 and 54 extending to the contact members 46 of the stop, straight ahead and right switches.

The bus bar 49 is connected by a wire 55 to the incandescent lamp within the stop exhibitor 15 and the wire 55 has a branch 56 to the contact member 45 of the stop switch.

The contact members 45 of the right and left switches are connected by wires 57 and 58 to the incandescent lamps 11 in the right and left compartments of the exhibitor casing 1, and the incandescent lamp 11 in the casing 3 is connected by a wire 59 to the contact member 45 of the straight ahead switch.

With the master switch closed the individual switches may be placed in circuit with the battery cells 31 and when the plunger 40 of the right switch is pulled outwardly the contact members 45 and 46 of said switch are electrically connected to complete an electric circuit that will illuminate the right sign of the exhibitor 1. The contact member 47 of the right switch also engages the bus bar 49 and completes an electric circuit for the stop exhibitor 15, so that the operator of a following automobile will be warned by the stop exhibitor that the signal carrying automobile is about to turn to the right and in so doing may slow up and possibly interfere with the movement of the following automobile.

Operation of the left switch is similar to the right switch, and the stop switch simply controls the stop exhibitor 15, while the straight ahead switch only controls the illumination of the lens or bull's-eye 10 of the exhibitor 1. It is thought unnecessary to follow out all of the electrical circuits in view of the simple wiring diagram shown in Fig 4, and while in the drawings there is illustrated a preferred embodiment of my automobile signal, which has been put into practice, yet I desire to be understood that the construction and arrangement of parts are susceptible to such changes as are permissible by the appended claim.

What I claim is:—

A multiple switch structure comprising a switch casing having a front wall, individual switches mounted in the front wall of said casing and adapted for four individual performances, each switch including a push and pull plunger with a pull on the plunger causing a performance, a bus bar supported in said casing in the rear of said switches and adapted for a circuit which may be closed simultaneously with a pull operation of either of two of said four switches, and a contact member carried by each of the two mentioned switches adapted for engagement with said bus bar to cause a performance in addition to that performed by either of said last mentioned switches.

In testimony whereof I affix my signature in presence of two witnesses.

FREDERICK H. PAQUIN.

Witnesses:
ARTHUR G. BALDAUF,
KARL H. BUTLER.